United States Patent [19]
Gauger

[11] Patent Number: 6,105,920
[45] Date of Patent: *Aug. 22, 2000

[54] VEHICLE POWER SEAT ADJUSTER WITH HIDDEN FLOOR MOUNT

[75] Inventor: Derek K. Gauger, Ann Arbor, Mich.

[73] Assignee: Lear Corporation, Southfield, Mich.

[ * ] Notice: This patent is subject to a terminal disclaimer.

[21] Appl. No.: 08/659,305

[22] Filed: Jun. 6, 1996

[51] Int. Cl.⁷ .......................................................... B60N 2/06
[52] U.S. Cl. .......................................... 248/429; 297/344.1
[58] Field of Search ................................ 297/344.1, 341; 248/429, 430

[56] References Cited

U.S. PATENT DOCUMENTS

| | | |
|---|---|---|
| 2,837,931 | 6/1958 | Brundage . |
| 2,919,744 | 1/1960 | Tanaka . |
| 3,319,921 | 5/1967 | Nichols . |
| 4,015,812 | 4/1977 | Heesch . |
| 4,274,293 | 6/1981 | Ruger . |
| 4,432,583 | 2/1984 | Russo et al. . |
| 4,448,381 | 5/1984 | Anspaugh et al. . |
| 4,483,504 | 11/1984 | Düwelshöft . |
| 4,602,758 | 7/1986 | Mann et al. . |
| 4,720,073 | 1/1988 | Mann et al. . |
| 4,802,374 | 2/1989 | Hamelin et al. . |
| 4,832,403 | 5/1989 | Tomita . |
| 4,949,585 | 8/1990 | Dauvegna et al. . |
| 4,962,963 | 10/1990 | Robinson . |
| 4,969,622 | 11/1990 | Münchow et al. . |
| 5,014,958 | 5/1991 | Harney . |
| 5,048,886 | 9/1991 | Ito et al. . |
| 5,125,611 | 6/1992 | Cox . |
| 5,150,872 | 9/1992 | Isomura . |
| 5,172,601 | 12/1992 | Siegrist et al. . |
| 5,199,764 | 4/1993 | Robinson . |
| 5,213,300 | 5/1993 | Rees . |
| 5,251,501 | 10/1993 | Katahira . |
| 5,259,257 | 11/1993 | Mouri . |
| 5,292,164 | 3/1994 | Rees . |
| 5,301,914 | 4/1994 | Yoshida et al. . |
| 5,358,274 | 10/1994 | Watanabe . |
| 5,393,028 | 2/1995 | Satoh et al. . |
| 5,445,354 | 8/1995 | Gauger et al. . |
| 5,456,439 | 10/1995 | Gauger . |
| 5,467,957 | 11/1995 | Gauger . |
| 5,487,520 | 1/1996 | Mouri et al. . |

FOREIGN PATENT DOCUMENTS

| | | |
|---|---|---|
| 0317381 | 5/1989 | European Pat. Off. . |
| 3724038 | 2/1989 | Germany . |
| 3918424 | 12/1990 | Germany . |
| 4127503 | 2/1993 | Germany . |
| 2260898 | 5/1993 | United Kingdom . |

*Primary Examiner*—Peter M. Cuomo
*Assistant Examiner*—Anthony D. Barfield
*Attorney, Agent, or Firm*—MacMillan, Sobanski & Todd, LLC

[57] ABSTRACT

A power seat adjuster has a pair of track assemblies, each formed of a stationary or fixed track and a movable track. A first diameter bore is formed in the fixed track extending from one side and co-axially aligned with a second bore in the fixed track. The second bore has a smaller diameter than the diameter of the first bore. A fastener has a shank and an enlarged head. The enlarged head of the fastener is disposable through the first bore and the shank is disposable through the second bore into engagement with vehicle floor.

9 Claims, 6 Drawing Sheets

VEHICLE POWER SEAT ADJUSTER WITH HIDDEN FLOOR MOUNT

BACKGROUND OF THE INVENTION

The present invention relates, in general, to vehicle seat adjusters.

Description of the Art

Power seat adjusters are a popular option on many automotive vehicles and are frequently offered as standard equipment on higher priced vehicles. Such power seat adjusters are primarily used on the driver's seat and, sometimes, on the front passenger seat of the vehicle to provide selective horizontal fore and aft and vertical movement of the seat as well as seat back recliner movement to accommodate occupants of different size and height as well as to provide a comfortable seating position to suit each occupant's preference.

Such power seat adjusters typically carry a seat support frame which supports the seat bottom and sometimes the seat back of a vehicle seat. The seat support frame is mounted on first and second, spaced track assemblies, each formed of an upper track which is connected to the seat support frame and which is slidably mounted on a lower track anchored to the vehicle floor. A horizontal drive mechanism typically includes a bi-directional electric motor which rotates a drive shaft extending outward from the motor to a gear assembly or box. In one arrangement, the gear box rotates a lead screw extending longitudinally along a track assembly. A drive block is fixedly mounted to one of the tracks and threadingly receives the lead screw to cause reciprocal, horizontal movement of the upper track and the attached seat support frame upon selective energization of the drive motor and the drive shaft. Typically two drive shafts, gear boxes, lead screws and drive nuts are employed in a horizontal drive, one set for each track assembly.

As the various drive motors are mounted between the track assemblies, the drive motor output shafts and the drive shafts connected thereto are typically oriented perpendicular to the axis of the associated lead screw. In order to transmit rotation and drive force between the output shaft of the drive motor and the drive shaft connected thereto to the 90° offset lead screw, each gear assembly or box typically includes a worm gear which is insert molded on one end of the associated lead screw. A worm is rotatably mounted in the gear box housing in meshing engagement with the worm gear and is connected to one of the drive motor output shafts or to one of the drive shafts so as to rotate the worm gear and thereby the lead screw upon bi-directional energization of the selective drive motor. Thus, each drive motor requires a separate gear assembly for each lead screw driven by the drive motor. This results in additional components on the power seat adjuster which add cost and take up valuable space in the already crowded space below a vehicle seat.

For a typical horizontal drive mechanism in a power seat adjuster, the horizontal drive mechanism includes one drive motor which may be mounted centrally or intermediately between the pair of track assemblies, two flex shafts extend from the drive motor to two gear boxes each connected to a lead screw, with one gear box and one lead screw associated with each of the pair of track assemblies.

It is also known to mount the drive nuts or drive blocks for self-alignment in a holder or housing to compensate for any misalignment between the lead screw or drive shaft. Thus, it is known to mount a drive nut in a lower track for rotation about a vertical axis as well as vertical sliding movement. Drive nuts have also been movably mounted in a housing affixed to one of the upper or lower tracks of a vehicle track assembly for movement in one of two mutually exclusive axes or planes relative to the housing.

The track assemblies for power seat adjusters have been constructed in a manner to resist separation of the upper track from the lower track during high force loading, such as occurs during a collision in which seat momentum, seat belt inertia, and occupant loading exert considerable force on the upper track which tends to separate the upper track from the lower track. To resist these forces, it is common to structurally design the upper and lower tracks with a sufficient strength and material cross-section to prevent track separation.

It is also known to provide interlocking notches and fingers in the upper and lower tracks which are normally spaced apart during regular sliding movement of the track assembly; but which are urged into fixed engagement to lock the upper track to the lower track during high impact loads. However, this has resulted in a larger cross-section track assembly which reduces the already minimal amount of open space below the vehicle seat and between the pair of track assemblies.

In vehicle power seat adjusters having independently elevatable front and rear seat drive mechanisms, such front and rear seat elevation is typically implemented by front and rear torsion tubes which are rotatably mounted between the front and rear ends of the pair of track assemblies. Motion linkages are fixedly mounted on the front and rear torsion tubes and are interconnected to the front vertical and rear ends of the seat support to elevate or lower the front and rear edges of the seat upon rotation of the torsion tubes by independent drive motors.

The torsion tubes have been typically mounted in the track assemblies by means of conventional bushings and separate brackets. In addition, a separate spacer has been mounted about each end of each torsion tube adjacent to the inboard surfaces of the track assemblies to provide a set spacing between the track assemblies and the motion linkages to maintain the motion linkages and the torsion tubes in the set design position.

However, it has been found that further improvements can be made to a vehicle power seat adjuster and it would be desirable to provide an improved power seat adjuster for a vehicle seat which overcomes certain deficiencies found in previously devised power seat adjusters. It would be desirable to provide a power seat adjuster which has only a single, horizontal drive motor and a single horizontal drive shaft; but which is still capable of simultaneously moving both movable tracks of the pair of track assemblies. It would also be desirable to provide a power seat adjuster having a unique horizontal drive system and drive nut mount which has a minimal number of components for a reduced cost, improved sound quality, reduced operating noise, more efficient assembly and reduced vibration.

It would also be desirable to provide a power seat adjuster which has a unique track assembly design which provides self-locking features during high impact loads. It would also be desirable to provide a power seat adjuster having a track assembly which exhibits a minimal lateral dimension or width for increased open area beneath the seat.

It would also be desirable to provide a unique track mounting arrangement which enables the track assemblies to be attached to the raised central tunnel portion of the vehicle floor in a manner to place the mounting fasteners in shear. It would also be desirable to provide a power seat adjuster having a track assembly mounting arrangement which enables the lateral dimension or width or the track assembly to be made as small as possible.

Finally, it would be desirable to provide a vehicle power seat adjuster having a unique torsion tube mounting arrangement having a minimal number of components.

SUMMARY OF THE INVENTION

The present invention is a power seat adjuster for a vehicle seat which provides at least horizontal fore and aft movement of the vertical seat.

In one embodiment, the power seat adjuster includes first and second space track assemblies, each formed of a fixed track stationarily mountable in a vehicle and a movable track, movably mounted on the fixed track for bi-directional movement along the fixed track. A drive means includes a bi-directional rotatable drive shaft. Means are coupled to the drive means for fixedly mounting the drive means to one of the tracks, such as the movable track of each of the first and second track assemblies. Means are fixed to the other track of each of the first and second track assemblies and engagable with the drive shaft for translating bi-directional rotation of the drive shaft to bi-directional translation of the drive means, coupling means and the movable tracks.

According to a preferred embodiment of the present invention, the drive means and the translating means are both mounted between the first and second track assemblies. Preferably, the drive means and the translating means are located substantially centrally between the first and second track assemblies. A single drive means, such as an electric motor, and a single translating means, such as a single threaded drive shaft and a single drive nut, are mounted centrally between the first and second track assemblies.

The drive motor is preferably fixedly mounted on a drive motor mounting bracket which is fixedly attached at opposite ends to one of the tracks, such as the movable tracks of the first and second track assemblies. A drive nut crossmember is fixedly connected at opposite ends to the other tracks, i.e., the fixed tracks, of each of the first and second track assemblies. The drive nut seats in a drive nut mounting member mounted on the crossmember and is threadingly engagable with the drive shaft such that rotation of the drive shaft upon activation of the drive motor results in translation of the drive shaft, the drive motor, the drive motor mounting bracket and the movable tracks relative to the drive nut, the drive nut crossmember and the fixed tracks of the first and second track assemblies.

Preferably, the drive nut mounting member is formed of a resilient material and mounted on the drive nut mounting crossmember for resiliently holding the drive nut. The mounting member has a cavity sized to closely conform to and receive the drive nut. The cavity forms two spaced walls in the holder, each of which includes an aperture coaxially aligned with a threaded internal bore formed into the drive nut when the drive nut is mounted in the recess. The mounting member provides a resilient mount for the drive nut which permits movement of the drive nut in at least one, and, preferably, two or more mutually exclusive planes, or axes, to compensate for any misalignment between the drive shaft and the drive nut.

The track assemblies of the present invention also have a unique structure in that the fixed and movable tracks have a generally vertical extent with a narrow width or lateral extent and are disposed laterally side by side with respect to each other. Preferably, the fixed track of each track assembly is disposed laterally outboard of the movable track. A lower end of the outer track is slidably disposed in a recess formed in a lower end extension of the inner track. An elongated recess is formed on the opposed, outer, upper and lower ends of each fixed track and on the opposed, outer upper and lower inner ends of the inner track. The opposed recesses form elongated bores which receive polymeric rollers or balls to provide sliding movement of one inner track along one fixed outer track.

During collision forces imposed on the seat track assemblies, which generally result from loads from the seat belt, seat inertia, and occupant loading, forces are transferred directly from the inner track to the outer track. The polymeric rollers crush to enable the inner and outer tracks to engage and lock together to transfer the load forces to the track assembly and therefrom directly to the vehicle floor. This directs such forces around any drive gear boxes which previously were part of the load path and had to be structurally strengthened to resist such forces or to crush or deform in a known manner during a collision.

The track assemblies of the present power seat adjuster also have a unique floor mounting arrangement which enables the overall width or cross-section of the track assemblies to be reduced since the mounting arrangement has a significantly higher structural strength than conventional risers. The mounting arrangement takes advantage of the raised central tunnel portion of the vehicle floor. An enlarged diameter bore is formed in the inner track and receives a fastener, such as a bolt having an enlarged head to be passed therethrough. A smaller diameter bore is formed in the opposite side surface of the inner track and receives the threaded shank of the fastener while retaining the enlarged head of the bolt completely within the exterior dimensions of the inner track. This enables the outer track to be closely disposed adjacent to the inner track thereby minimizing the overall cross-sectional width of the track assembly to open up more free area below the vehicle seat. In addition, the mounting bolt is placed in shear which provides a substantially higher mounting strength than with the conventional risers employed in power seat adjusters which are vertically aligned with the longitudinal extent of the track assemblies.

The power seat adjuster of the present invention also utilizes a unique single piece bushing/spacer for rotatably mounting the opposite ends of at least the front torsion tube to the opposed track assemblies. The bushing/spacer is fixedly mounted in the track assemblies such as in the outer track and has an end portion sized to rotatably receive and support one end of the torsion tube. The length of the bushing from an enlarged head engaged with the outer track provides a spacer distance to a motion link typically mounted on the torsion tube. In this manner, the rotatable busing function and the spacer function previously provided by two separately elements, namely, a separate bushing and a separate spacer, is combined into a single element which reduces manufacturing cost and assembly time.

The power seat adjuster of the present invention provides significant advantages over previously devised power seat adjusters. The unique floor mount of the present invention provides several unique advantages in a power seat adjuster. First, the mounting fastener or bolt is placed in shear which provides significantly increased structural strength. Secondly, since the head of the mounting fastener or bolt is completely contained within the exterior confines of the inner track, the outer track may be disposed more closely adjacent to the inner track thereby minimizing the overall width or lateral extent of the track assembly. This increases the amount of free space or area below the vehicle seat and between the pair of track assemblies.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 1:
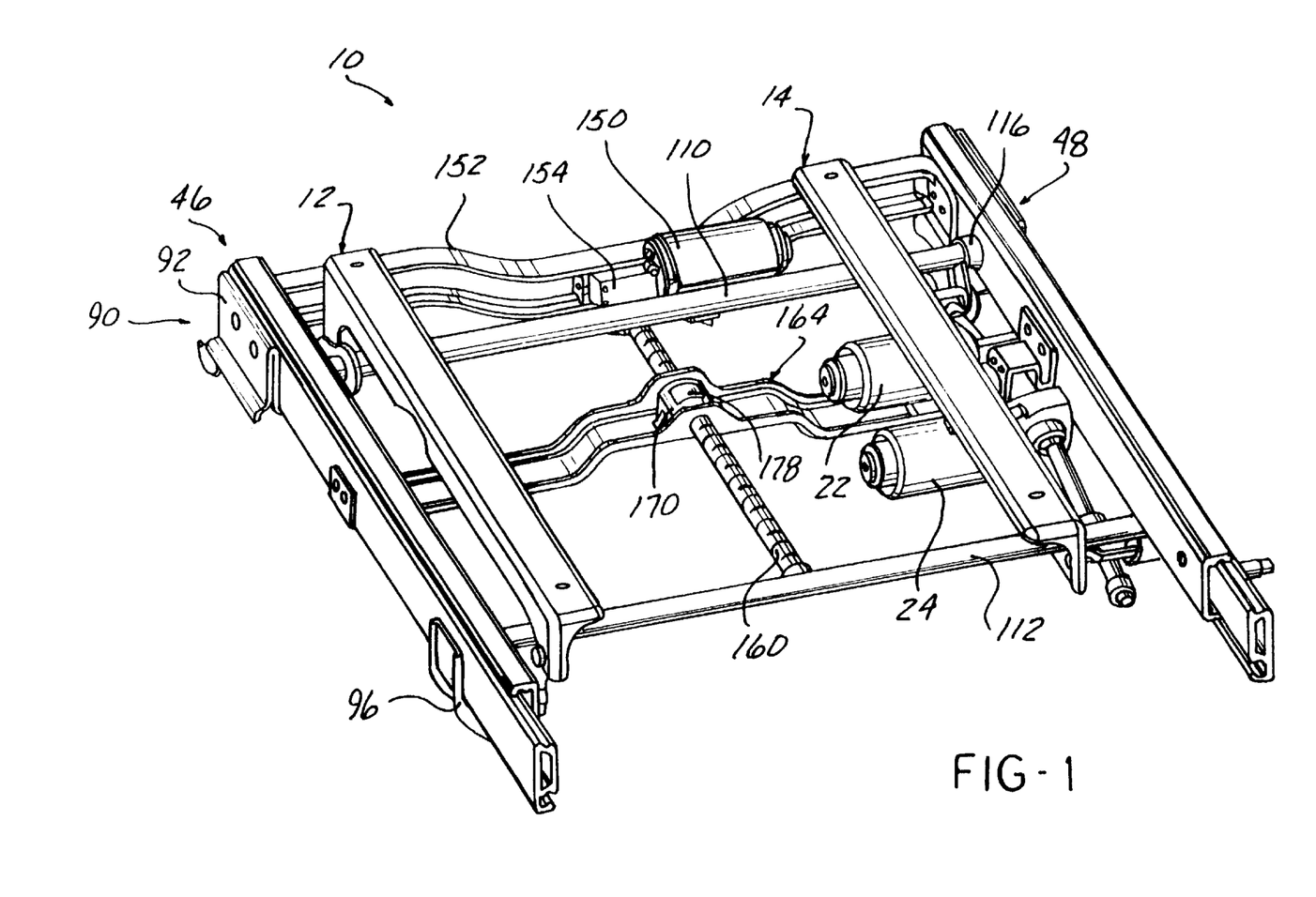
FIG. 1 is a rear perspective view of a power seat adjuster constructed in accordance with the teachings of the present invention.
Figure 2:
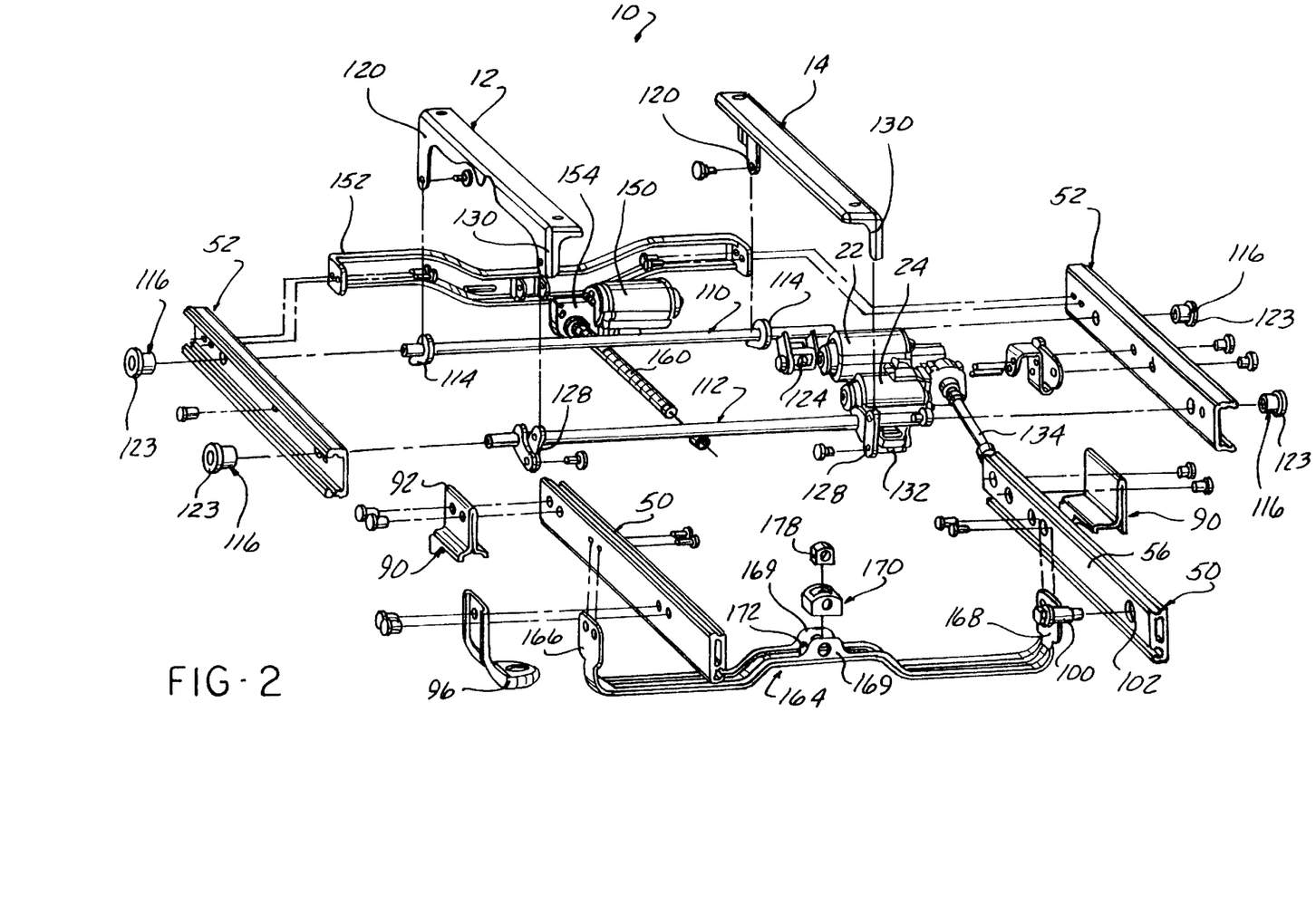
FIG. 2 is an exploded perspective view of the power seat adjuster shown in FIG. 1.
Figure 3:
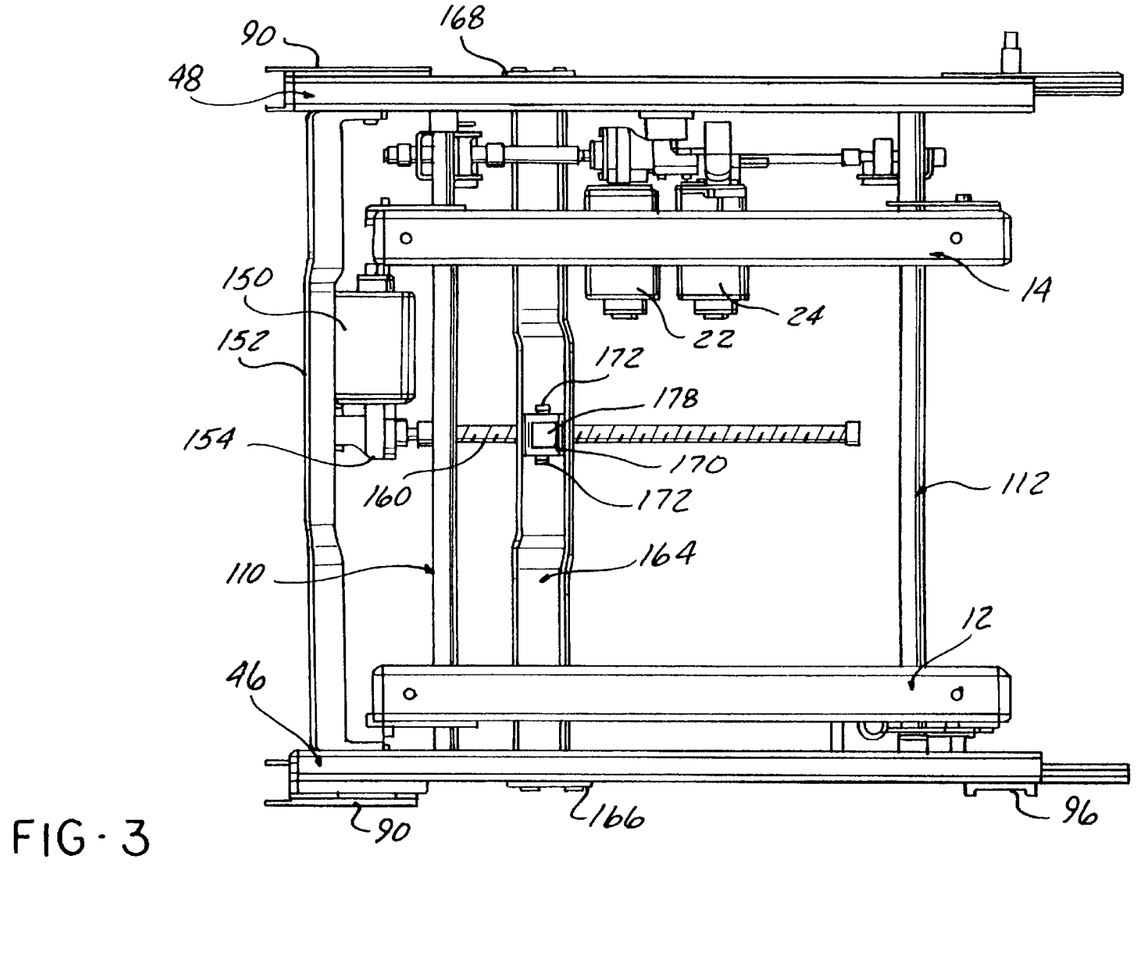
FIG. 3 is a plan view of the power seat adjuster shown in FIG. 1.

Referring now to the drawing, and to FIGS. 1, 2 and 3 in particular, there is illustrated a power seat adjuster 10 which variably positions an automotive vehicle seat in any occupant selected position. The power seat adjuster 10 is a so-called "six-way" adjuster providing horizontal fore/aft, vertical up and down, and independent movement of each of the front and rear edges of the seat adjuster 10. It will be understood, however, that the present invention described hereafter is employable with a power seat adjuster which includes at least a horizontal fore/aft movement, by itself or in combination with any of the other such movements described above.

As is conventional, the power seat adjuster 10 supports a conventional vehicle seat, not shown, which includes a seat bottom or cushion and a seat back. An upper seat support frame is provided on the power seat adjuster 10 for supporting and connecting the seat bottom and the seat back to the power seat adjuster 10. The upper seat support frame includes a pair of spaced, longitudinally extending frame members or rails 12 and 14. Mounting surfaces on the front end and at the rear end of the frame members 12 and 14 enable connection of a seat bottom to the upper support frame. It will be understood that in lieu of the seat support frame members 12 and 14, suitable mounting brackets may be provided on the power seat adjuster 10 for direct attachment of a seat bottom of a vehicle seat to the power seat adjuster 10.

Various drive assemblies are mounted on the power seat adjuster 10 to provide selective movement of the power seat adjuster 10 along various axes. For example, front and rear vertical drive motors 22 and 24, respectively, are mounted on the power seat adjuster 10 and connected to conventional lead screws, drive blocks or nuts, links and torsion tubes to independently elevate the front and rear edges of the seat support frame members 12 and 14, respectively, and, thereby, to provide selective, vertical adjustment of the front and rear edges of the vehicle seat.

The power seat adjuster 10 also includes front and rear tubular torsion tubes or rods 110 and 112, respectively, which extend between and are connected to opposed track assemblies denoted generally by reference numbers 46 and 48 to provide a rigid support structure for the power seat adjuster 10.

As each of the track assemblies 46 and 48 is identically constructed, the following description will be provided for only track assembly 48. It will be understood that the opposite track assembly 46 is constructed in the same manner.

Figures 5, 7:
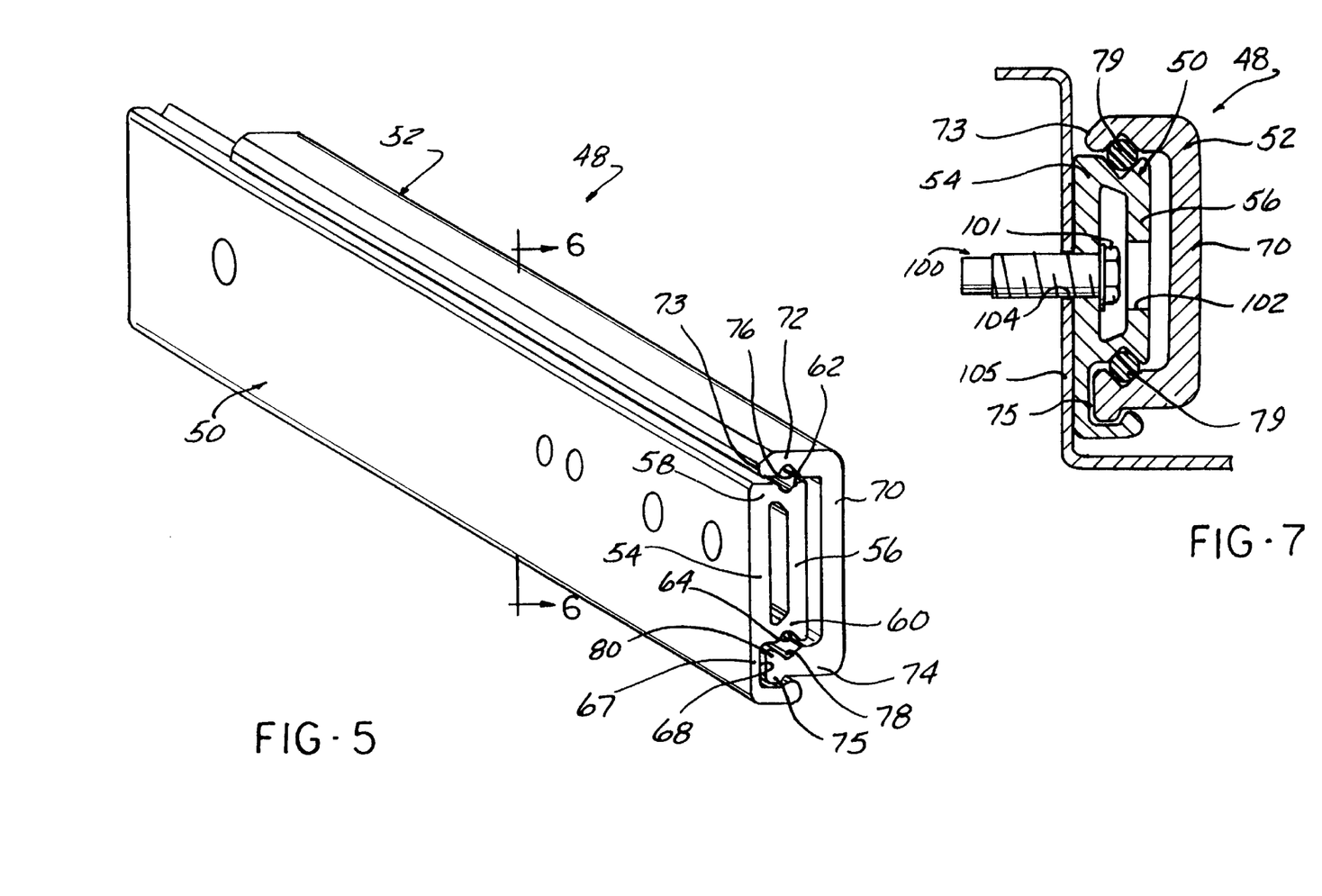
FIG. 5 is an enlarged, perspective view of one of the track assemblies shown in FIGS. 1 and 2.
FIG. 7 is a cross-sectional view similar to FIG. 6 but showing the mounting of the inner track to the vehicle in one embodiment of the present invention.
Figure 6:
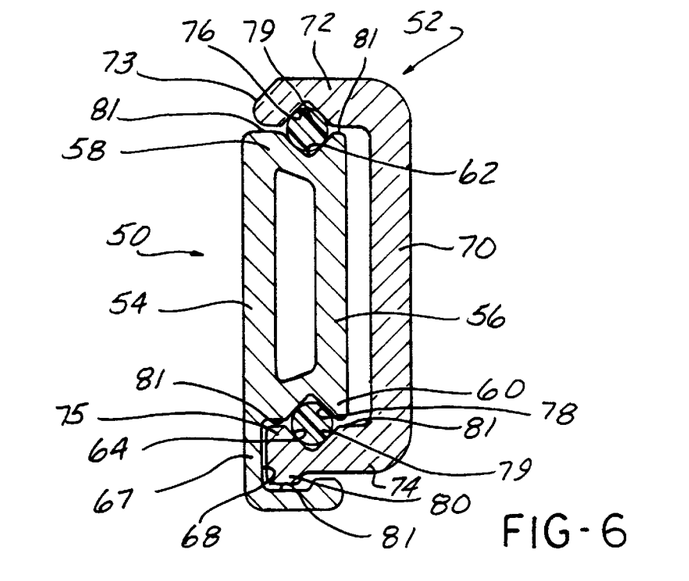
FIG. 6 is a cross-sectional view generally taken along line 6—6 in FIG. 5.

As shown in FIGS. 1–3, and in greater detail in FIGS. 5, 6 and 7, the track assembly 48 includes an inner track 50 and an outer track 52 which are generally disposed side by side, with a major dimension or length extending vertically with respect to the flow of the vehicle. The tracks 50 and 52 are higher than wide and are typically formed of extruded aluminum. The inner track 50 is formed, by example only, with a web structure including a first wall 54 and a spaced second wall 56 which are interconnected at a first or upper end 58 and at a second, opposite, or lower end 60. The first and second ends 58 and 60 extend horizontally along the length of the inner track 50 and have arcuate grooves 62 and 64 formed therein, respectively. The purpose of the grooves 62 and 64 will become more apparent hereafter. A lower extension 67 of the wall 54 extends downward from the second end 60 and curves or bends substantially in parallel to and spaced from the second end 60, as shown in FIGS. 5 and 6, to form a longitudinally extending recess 68.

The outer track 52 has a generally C-shaped configuration formed of a central wall 70, a first or upper end wall 72 and a second or lower end wall 74. The first end wall 72 overlays the top end 58 of the inner track 50 and has elongated, horizontally extending arcuate groove 76 formed therein which is opposed to the groove 62 i the first end 58 of the inner track 50 to form an elongated bore extending along the inner and outer tracks 50 and 52. Similarly, the second end wall 74 of the outer track 52 has an arcuate recess 78 extending therealong which is disposed opposite from and is complementary to the recess 64 formed in the second end 60 of the inner track 50. The recess 64 and 78 combine to form an elongated bore extending along the length of the track assembly 48. At least one and preferably a series of longitudinally spaced rollers or balls 79 are disposed in the respective bores formed between the facing ends of the inner and outer tracks 50 and 52 to provide sliding contact and free movement of the outer track 52 along the inner track 50. The rollers or balls 79 are formed of a deformable polymeric material, such as an acetal sold under the tradename DELRIN and CELCON.

The second end wall 74 of the outer track 52 has an enlarged end 80 which confirms to and is slidably disposed within the recess 68 in the lower extension 67 of the inner track 50.

As shown in FIGS. 5, 6, and 7, central wall 70 of the outer track 52 is disposed closely adjacent to the second wall 56 of the inner track 50. Also, the outer ends 73 and 75 of the upper end wall 72 and the lower end wall 74, respectively, extend only partially over the lateral width of the inner track 50 and are spaced from the far outer surface of side wall 54 to again provide a minimal cross-sectional width for the complete track assembly 48.

During a vehicle collision, forces or loads are transmitted from the occupant's seatbelt through the seatbelt mounting bracket, not shown, which is typically attached to the rear end of the outer track 52. Such forces pull the rear end of the outer track 52 upward and forward, crushing or deforming the balls 79 and bringing the adjacent surfaces of the lower end wall 74 of the outer track 52 into point contact 81 with the opposed surfaces of the second end 60 of the inner track 50. Contact points 81 under external force loads are also located at opposite side edges of the recesses 64 and 78 and along the outer side edge of the enlarged end 80 of the outer track 52 and the inner surface of the recess 68 in the inner track 50. This locks the inner and outer tracks 50 and 52 together thereby enabling a direct transfer of load forces from one track to the other track and then to the vehicle floor.

In order to stationarily affix the power seat adjuster 10 to the vehicle, such as to the floor of the vehicle, a pair of front risers 90 shown in FIGS. 1–3 are connected by suitable fasteners, such as rivets, to the forward end of each inner track 50 of the track assemblies 46 and 48. Each front riser 90 has a planar flange 92 which abuts the planar end portion of each inner track 50. A lower flange assembly extends from the flange 92 and provides a suitable mount for a fastener to fixedly attach the front riser 90 to the vehicle floor.

As shown in FIGS. 1 and 2, a rear outboard riser 96 is connected to a rear end portion of the laterally outboard inner track 50. The rear riser 96 has a generally curved or L-shaped section with one end receiving suitable fasteners, such as rivets, for attaching the rear riser 96 to the inner track 50 and a lower portion which receives a suitable fastener for attaching the rear riser to the vehicle floor.

Another novel feature of the power seat adjuster 10 is a hidden floor mount which attaches the rear inboard end of each movable track 50 to the side of the raised central tunnel portion of a vehicle floor.

As shown in FIGS. 6 and 7, a fastener, such as a bolt 100, has an enlarged head 101. An enlarged diameter bore 102 is formed through the side wall 56 of the inner track 50 allowing access to the open space or cavity between the walls 54 and 56 of the inner track 50. The aperture 102 has a diameter to enable the head 101 of the bolt 100 to pass freely therethrough. A smaller diameter bore 104 is formed on the opposed wall 54 of the inner track 50 in coaxial alignment with the enlarged bore 102 and has a diameter to receive only the shaft of the bolt 100 therethrough. The threaded shank of the fastener 100 is threadingly engagable with the side wall 105 of the raised, central tunnel portion of the vehicle floor to securely attach the rear end portion of the inboard track assembly 46 to the vehicle floor. This attachment takes place with the outer rail 52 moved to a forward position to expose the aperture 102.

Alternately, the inner track 50 could have a solid cross section with the two bores 102 and 104 contiguous with each other. The head 101 of the bolt 100 is thereby contained completely within the exterior dimensions of the inner track 50. This enables the outer track 52 to be disposed close to the inner track 50 and results in a small overall lateral extent or width for the entire track assembly 46 thereby increasing the amount of open space below the seat as well as reducing material, weight, costs, etc.

As shown in FIGS. 1–3, the front torsion tube 110 and the rear torsion tube 112, which may be hollow tubular members or solid rods or bars, are rotatably mounted between the outer tracks 52 of the track assemblies 46 and 48 for horizontal, bi-directional movement with the outer tracks 52. In an alternate seat adjuster configuration, the torsion tubes 110 and 112 could also be rotatably mounted to the inner tracks 50 or to the seat pan.

Figures 8, 9:
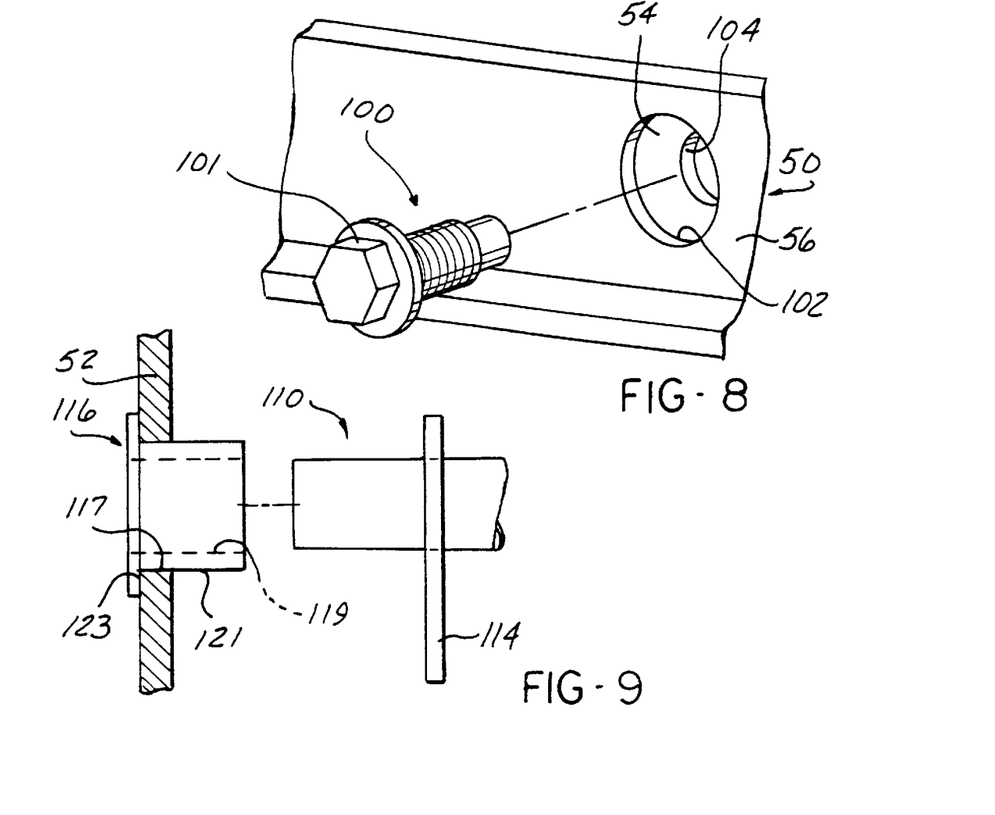
FIG. 8 is a partial, exploded, perspective view of the hidden mounting fastener shown in FIG. 7.
FIG. 9 is an enlarged, exploded, side elevational view of the torsion tube bushing in its mounted position.

According to a unique feature of the present invention, a one-piece bushing/spacer 116, shown in detail in FIGS. 3 and 9, is fixedly mounted or press fit in a bore 117 in each outer track 52. The busing 116 has an enlarged head 123 which abuts one side of the outer track 52. The bushing 116 has a sleeve end extending from the head 123 which has a hollow bore 119 sized to receive one end of the front torsion tube 110. The outer surface 121 of the sleeve end of the bushing/spacer 116 may also be splined, knurled or otherwise formed with a roughened, contoured surface for secure, fixed engagement with the inner surface of the a bore 117 in the outer track 52. However, despite the fixed mounting of the bushing/spacer 116, the front torsion tube 110 is able to freely rotate within each bushing/spacer 116. It will be understood that the bushing/spacer 116 could be formed with only a sleeve end without a head 123.

As shown in FIG. 2, motion links 114 are fixedly mounted, such as by welding, to opposite ends of the front torsion tube 110, generally spaced inboard from the outer ends of the front torsion tube 110. The motion links 114 are pivotally connected to a depending leg 120 integrally formed with or attached to a front end of each seat support frame member 12 and 14 as shown in FIG. 2. The sleeve end of the busing 116 has a length to space the motion link 114 at an established distance from the outer track 52. In this manner, the single, one piece busing 116 eliminates the separate space and bushings previously employed on power seat adjusters.

A vertical drive means, such as a vertical motor 22 is mounted via a frame to one of the outer tracks 52. A bi-directionally rotatable output shaft of the vertical drive motor 22 fixedly engages a bracket 124 fixedly mounted, such as by welding, on one end of the front torsion tube 110. In this manner, rotation of the output shaft of the vertical motor 22 results in simultaneous and equal rotation of the front torsion tube 110 thereby causing vertical movement in either an upward or downward direction at the front end of the seat support members 12 and 14 and the vehicle seat attached thereto.

In a similar manner, the rear torsion tube 112 is rotatably mounted at opposite ends to the outer tracks 52. Although not shown in the drawings, the outer ends of the rear torsion tube 112 can also be rotatably supported by one piece bushing/spacers 116 mounted in bores in each outer track 52. Opposed motion linkages 128 are fixedly mounted, such as by welding, at one end to opposite ends of the rear torsion tube 112. An opposite end of one of the pivotal links of each linkage 128 is pivotally connected to a rear depending leg 130 of the seat support members 12 and 14.

A drive nut 132 is carried by one linkage 128 and threadingly engages a lead screw 134 which is rotatably connected to an output shaft of the rear vertical drive motor 24. Bi-directional rotation of the lead screw of shaft 134 causes traversal of the drive nut 132 therealong and a resulting pivotal movement of the linkage 128 and the rear torsion tube 112. This results in vertical elevation or lowering of the rear end of the seat mounted on the seat support members 12 and 14.

Figure 4:
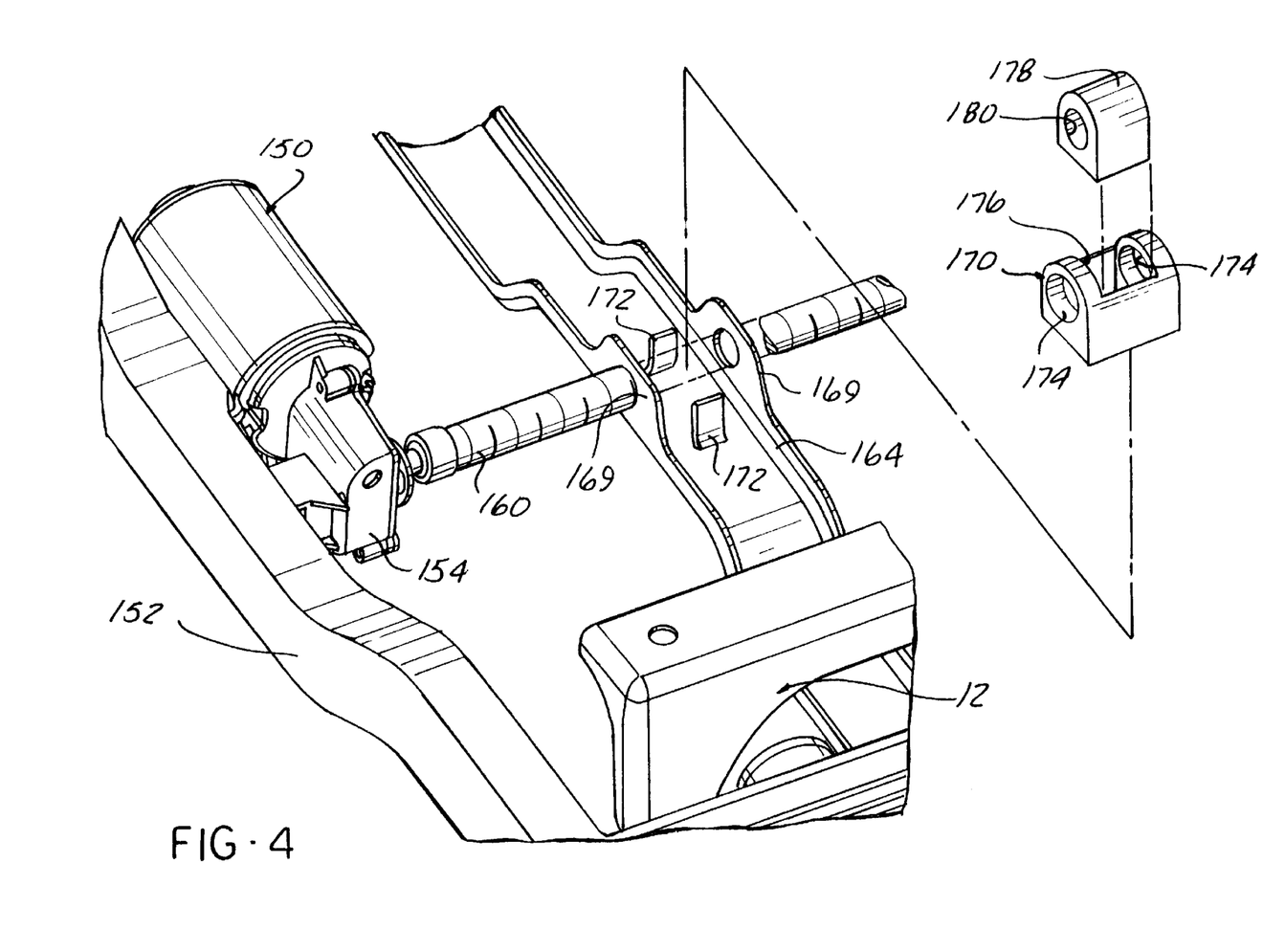
FIG. 4 is an enlarged, exploded perspective view of the drive nut and drive nut mount shown generally in FIGS. 1 and 3.

As shown in FIGS. 1–3 and, in greater detail in FIG. 4, the power seat adjuster 10 includes a unique horizontal drive mechanism which causes horizontal, bi-directional movement of the seat with respect to the fixed inner tracks 52 of each track assembly 46 and 48.

A drive means, such as an electric motor 150 having a bi-directional, rotatable output shaft is fixedly mounted to a horizontal motor mounting bracket 152. The mounting bracket 152 has outer ends which abut and provide mounting surfaces for suitable fasteners to fixedly mount the mounting bracket 152 to the outer tracks 50.

The rotatable output shaft of the horizontal drive motor 150 engages a suitable gear means or transmission 154 which is fixedly mounted to the mounting bracket 152 as shown in FIGS. 1–4.

A horizontal lead screw or drive shaft 160 is rotatably engaged with the gear means 154 and is bi-directionally rotatable with bi-directional rotation of the output shaft of the horizontal drive motor 150.

According to a unique feature of the present invention and as shown in FIGS. 1–4, the horizontal lead screw or drive shaft 160 is located intermediate the outer tracks 52 of the track assemblies 46 and 48. Preferably, the horizontal lead screw 160 is located substantially centrally between the outer tracks 52. This provides a single, center horizontal drive for the power seat adjuster 10 which eliminates the need for separate horizontal lead screws in each of the two track assemblies as is commonly employed in previously devised power seat adjusters.

An elongated mounting bracket 164 has opposed outer ends 166 and 168 which are fixedly connected by suitable fasteners, such as rivets, to an intermediate portion of each inner track 52. The outer ends 166 and 168 of the mounting bracket 164 extend outward beyond the wall 54 of each inner track 50 as shown in FIG. 2. This fixedly and stationarily attached the mounting bracket 164 to the fixed inner tracks 50 with respect to the movable, horizontal drive motor mounting bracket 152 and the movable outer tracks 52.

Alternately, the mounting bracket 164 could be fixed to the outer tracks 50 if the drive motor bracket 152 is mounted on the inner tracks 52.

A pair of spaced mounting flanges 169 are formed substantially centrally on the mounting bracket 164. Each flange 169 has an aperture which rotatably receive the horizontal lead screw or drive shaft 160 therethrough as shown in FIGS. 1, 2, and 4.

According to a unique feature of the present invention, a drive nut cushion or holder 170 is fixedly mounted between the flanges 169. A pair of spaced mounting clips 172 may be attached to the mounting bracket 164, as shown in FIG. 4, for lateral positioning of the cushion or holder 170.

The holder 170 has a generally cubical form with a pair of coaxially aligned apertures 174 formed on two opposite walls. The apertures 174 are sized to rotatably receive the horizontal lead screw 160 therethrough. A cavity or recess 176 is formed in the cushion or holder 170 and is sized to receive a drive nut 178. The drive nut 178 has a generally cubical configuration with a threaded internal bore 180 extending longitudinally therethrough. The bore 180 threadingly engages the horizontal lead screw 160.

The holder 170 is formed entirely or at least on an inner portion thereof, of a resilient material, such as polyurethane, for example. Due to such resiliency, the drive nut 178 can twist or rotate about a first horizontal plane extending axially through the apertures 174 in the walls or rotate in a second plane perpendicular to the first plane to compensate for any misalignment of the drive screw 160 and the drive nut 178. The apertures 174 will have a larger I.D. than the O.D. of the drive screw 160 to accommodate any lateral or vertical movement of the drive screw 160. The open upper end of the cavity 176 also allows vertical translation of the drive nut 178 relative to the holder 170.

In operation, since the mounting bracket 164 is attached to the stationarily mounted inner tracks 50 of each of the track assemblies 46 and 48, the drive nut 178 remains stationary with respect to the movable outer tracks 52. When the horizontal drive motor 150 is activated to move the seat in either a forward or a rearward, horizontal direction, rotation of the horizontal lead screw 160 in either direction results via the threaded engagement of the lead screw 160 and the drive nut 178 in threaded movement of the lead screw 160 through the drive nut 178. This results in sliding movement of the horizontal drive motor mounting bracket 152 and the outer tracks 52 with respect to the stationary mounting bracket 164 and the stationary inner tracks 50 thereby enabling selective horizontal positioning of the outer tracks 52 with respect to the stationary inner tracks 50. As noted above, since the front and rear torsion tubes 110 and 112 are carried by the outer tracks 52, the seat support members 12 and 14 interconnected to each of the front and rear torsion tubes 110 and 112, as described above, also are selectively horizontally moved.

In summary, there has been disclosed a power seat adjuster having unique features which provide significant advantages over previously devised power seat adjusters. The power seat adjuster of the present invention has a unique floor mounting arrangement which invention has a unique floor mounting arrangement which provides increased structural strength thereby enabling the strength, size and material employed in forming the track assemblies to be reduced thereby reducing the manufacturing cost of the power seat adjuster. Further, the mounting arrangement enables the outer track to be disposed more closely adjacent to the inner track thereby significantly reducing the overall width or lateral extent of the track assemblies. This opens up more free area or space below the vehicle seat and between the track assemblies.

What is claimed is:

1. A power seat adjuster for a seat mountable in a vehicle, the power seat adjuster comprising:

first and second spaced track assemblies, each of the first and second track assemblies formed of a fixed track adapted to be stationarily mounted in a vehicle, and a movable track movably mounted on the fixed track for bi-directional movement along the fixed track;

drive means, coupled to the fixed tracks and the movable tracks of the first and second track assemblies, for bi-directionally translating the movable tracks relative to the fixed tracks;

each fixed track of the first and second track assemblies has a rectangular cross section with a vertical side wall with opposed side surfaces, and a pair of end walls;

each movable track of the first and second track assemblies has a side wall with opposed end walls, each end wall of each movable track opposed from one end wall of one of the fixed tracks;

the side wall of each movable track disposed laterally adjacent one side surface of the vertical side wall of the fixed track; and means, having a head end disposed completely within the opposed side surfaces of the vertical side wall of each fixed track and an opposed end extending outward from one side surface of the vertical side wall, adapted for fixedly mounting the fixed track to a vehicle.

2. The power seat adjuster of claim 1 wherein:

the vertical side wall of each fixed track is formed of two spaced side walls;

a cavity is formed between the two side walls; and the fixedly mounting means includes:

a fastener having a shank and an enlarged head;

a first bore formed in one of the side walls and receiving the shank of the fastener; and a second bore formed in the other of the side walls, the second bore having an enlarged diameter to receive the head of the fastener therethrough to dispose the head of the fastener completely within the cavity.

3. The power seat adjuster of claim 2 further comprising:

the enlarged head of the fastener has a diameter larger than a diameter of the shank.

4. The power seat adjuster of claim 1 wherein:

a discrete bore is formed in the one side surface of the vertical side wall of each fixed track, the fixedly mounting means extending through the discrete bore.

5. An improvement for mounting a power seat adjuster in a vehicle, including first and second spaced track assemblies, each formed of a fixed track having a vertical side wall with opposed side surfaces and a movable track disposed adjacent to the vertical side wall of the fixed track, the improvement comprising:

means, having a head end disposed completely within the opposed side surfaces of the vertical side wall of each fixed track and having another end extending outward from one side surface of the vertical side wall, adapted for fixedly mounting the fixed track to a vehicle.

6. The improvement of claim 5 wherein the fixedly mounting means comprises:

a first bore having a first diameter formed in and extending laterally through the fixed track;

a second bore coaxial with the first bore and having a second diameter smaller than the first diameter of the first bore, the second bore formed in the fixed track and extending from the first bore; and a fastener having a head end and a shank, the fastener freely passable completely through an open end of the first bore to bring the head end into engagement with a shoulder formed at the juncture of the first bore with the second bore and the shank extending through the second bore into engagement with a vehicle floor.

7. The improvement of claim 5 wherein:

each fixed track is formed of two vertical, spaced side walls;

a cavity is formed between the two side walls; and the fixedly mounting means includes:

a fastener having a shank and an enlarged head;

a first bore formed in one of the side walls and receiving the shank of the fastener; and a second bore formed in the other of the side walls, the second bore having an enlarged diameter to receive the head of the fastener therethrough to dispose the head of the fastener completely within the cavity.

8. The power seat adjuster of claim 5 wherein:

a discrete bore is formed in the one side surface of the vertical side wall of each fixed track, the fixedly mounting means extending through the discrete bore.

9. A power seat adjuster for a seat mountable in a vehicle, the power seat adjuster comprising:

first and second spaced track assemblies, each of the first and second track assemblies formed of a fixed track adapted to be stationarily mounted in a vehicle, and a movable track movably mounted on the fixed track for bi-directional movement along the fixed track;

drive means, coupled to the fixed tracks and the movable tracks of the first and second track assemblies, for bi-directionally translating the movable tracks relative to the fixed tracks;

each fixed track of the first and second track assemblies has a rectangular cross section with a vertical side wall and a pair of end walls extending from the side wall;

each movable track of the first and second track assemblies has a side wall with opposed end walls, each end wall of each movable track opposed from one end wall of one of the fixed tracks;

the side wall of each movable track disposed laterally adjacent the fixed track; and means, having an end contained completely within each fixed track, adapted for fixedly mounting the fixed track to a vehicle;

each fixed track having a vertical wall;

a first bore having a first diameter formed in the vertical side wall and extending laterally through the vertical side wall from a first side surface;

a second bore coaxial with the first bore and having a second diameter smaller than the first diameter of the first bore, the second bore formed in the vertical side wall and extending from the first bore to an opposed side of the vertical side wall;

the mounting means including:

a fastener having a shank and an enlarged head; and the enlarged head freely passable through the first bore into engagement with a shoulder formed at the juncture of the first bore with the second bore, the shank of the fastener extending through the second bore and adapted to be engaged with a vehicle floor.

* * * * *